(12) United States Patent
Pellenc et al.

(10) Patent No.: US 8,642,910 B2
(45) Date of Patent: Feb. 4, 2014

(54) SELECTIVE-SORTING HARVESTING MACHINE AND SORTING CHAIN INCLUDING ONE SUCH MACHINE

(75) Inventors: Roger Pellenc, Pertuls (FR); Rémi Niero, Condrieu (FR)

(73) Assignee: Pellenc (Societe Anonyme), Pertuis (FR)

( * ) Notice: Subject to any disclaimer, the term of this patent is extended or adjusted under 35 U.S.C. 154(b) by 197 days.

(21) Appl. No.: 12/674,125

(22) PCT Filed: Sep. 5, 2008

(86) PCT No.: PCT/FR2008/001241
§ 371 (c)(1),
(2), (4) Date: Jan. 28, 2011

(87) PCT Pub. No.: WO2009/066020
PCT Pub. Date: May 28, 2009

(65) Prior Publication Data
US 2011/0112684 A1    May 12, 2011

(30) Foreign Application Priority Data
Sep. 6, 2007 (FR) ..................................... 07 06240

(51) Int. Cl.
B07C 5/342 (2006.01)
(52) U.S. Cl.
USPC ........... 209/576; 209/538; 209/571; 209/577; 700/223; 250/341.8
(58) Field of Classification Search
USPC ..................... 209/4, 539, 552, 577, 938, 939; 382/110
See application file for complete search history.

(56) References Cited

U.S. PATENT DOCUMENTS

| | | | |
|---|---|---|---|
| 4,221,297 A * | 9/1980 | Aranda Lopez et al. | 209/576 |
| 4,901,861 A * | 2/1990 | Cicchelli | 209/539 |
| 5,060,290 A | 10/1991 | Kelly et al. | |
| 5,440,127 A * | 8/1995 | Squyres | 250/341.8 |
| 5,791,497 A * | 8/1998 | Campbell et al. | 209/577 |
| 5,799,105 A * | 8/1998 | Tao | 382/167 |
| 6,610,953 B1 | 8/2003 | Tao et al. | |
| 6,696,655 B2 * | 2/2004 | Harbeck et al. | 209/571 |
| 6,727,452 B2 * | 4/2004 | Schrader | 209/576 |
| 8,045,168 B2 * | 10/2011 | Missotten et al. | 356/445 |

(Continued)

FOREIGN PATENT DOCUMENTS
EP    0719598 A    7/1996

*Primary Examiner* — Terrell Matthews
(74) *Attorney, Agent, or Firm* — Egbert Law Offices, PLLC

(57) ABSTRACT

A selective-sorting berry-harvesting machine includes a supply system which supplies a computer vision system, a computer vision system including an artificial vision device for acquiring images of harvest components originating from the supply system and a processing device for analyzing said images so that the harvest components can be recognised and differentiated according to pre-established criteria, and a system for selectively separating whole, ripe and healthy berries from other components of the harvest, controlled by the processing device. The supply system is configured such that the harvest can be spread out to form a single layer, harvest components can be isolated individually and the harvest components, particularly the whole, ripe and healthy berries, can be moved rectilinearly at a controlled speed so that they are conveyed individually through the computer vision system. The computer vision system is configured to individualize and locate each element to control the selective separation system.

40 Claims, 12 Drawing Sheets

(56) References Cited

U.S. PATENT DOCUMENTS

| | | |
|---|---|---|
| 2003/0127372 A1* | 7/2003 | Kenneway .................... 209/538 |
| 2006/0070928 A1* | 4/2006 | Lovhaugen et al. .......... 209/576 |
| 2008/0217217 A1* | 9/2008 | Toms ............................ 209/579 |
| 2008/0302707 A1* | 12/2008 | Bourely ........................ 209/577 |
| 2009/0107896 A1* | 4/2009 | Gochar, Jr. .................... 209/577 |
| 2011/0112684 A1* | 5/2011 | Pellenc ......................... 700/223 |

* cited by examiner

SELECTIVE-SORTING HARVESTING MACHINE AND SORTING CHAIN INCLUDING ONE SUCH MACHINE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a selective sorting harvesting machine, in particular for grape harvesting. It also concerns a sorting chain including this machine.

The sorting machine according to the invention is more specifically intended for sorting of grape harvest components, but this sorting machine can also be used advantageously for sorting of other berry or small fruit crops such as blackcurrant, gooseberries, huckleberries, bilberries, cranberries, cherries, coffee beans, or plums.

Because of the particularly advantageous application of the invention for sorting of grape harvest components, we are describing below an example of the implementation of this application, but we emphasize that this usage is by no means limiting.

2. Description of Related Art Including Information Disclosed Under 37 CFR 1.97 and 37 CFR 1.98

It is well known that between the harvest and actual startup of the processes and equipment for wine making, the grapes undergo various operations to eliminate debris that is undesirable for the elaboration of wines.

In most cases, regardless of whether the harvesting was done manually or by mechanical means (grape picking machines), the grapes are de-stemmed before and/or after a sorting operation.

When this occurs before the stripping, and in particular in the case of mechanical harvesting, the sorting operation may be performed manually on straight or vibrating sorting tables or mechanically. For example, by means of a sorting device mounted on the harvesting machine. In this case, the manual sorting allows for elimination of grapes that are rotten or not ripe enough as well as a certain volume of undesirable foreign matter such as leaves, leaf-stalks, twigs, insects and small animals.

On the other hand, one is aware (FR-2 795 599) of a sorter mounted on a harvesting machine and which features a travelling screen in the form of an endless belt and in proximity of its drop-off end there is an aspirator, this travelling screen being constituted by a number of tilting modules arranged one after the other. The sorter permits the extraction of a high percentage of leaves, grape stalks without fruit and other vegetable detritus. It also allows extracting the berries or grains detached from the stalks by the harvesting system and the juice coming from the bursting of a certain percentage of berries due to the action of the harvesting system.

The stem removal can be performed by different types of stalk separators or hull removers. The function of these devices is to clean up the grape harvest, whether it has undergone a first sorting or not. They also permit eliminating a certain percentage of foreign matter. In other words, the purpose of these devices is to separate the detached berries and the juice from other vegetable matter habitually picked up by the machine.

Complementary sorting, manual on a sorting table, or mechanized on an automatic sorting table or some other specific equipment is generally necessary downstream of the stalk removal, in order to eliminate if not all but at least most of the foreign objects still present such as leaf parts, leaf stalks, twig fragments, immature, botrytized or shattered grape berries and various debris (debris from supporting stakes, clips, insects, etc.).

After this complementary sorting, the harvest is composed of whole and healthy ripe berries; immature or shattered berries; crushed or burst berries; and bits of skin, stones and miscellaneous detritus.

To ensure the production of high gustatory quality, it is desirable to use only fully ripened, whole and healthy grape berries.

The configuration provides for achieving a qualitative separation of the berries into three categories, depending on their quality, so as to allow, if desired, separate vinification of each of them.

A technique that is proposed to obtain this result, involves dumping the grapes which have been previously de-stemmed and sorted—before and/or after the de-stemming—on a drum rotating around a horizontal axis. The berries are differentiated only by their consistency. A first category is constituted by whole grapes which do not adhere to the roll, a second category consists of burst grapes and debris which adhere to the roll but come unstuck from it by the centrifugal force generated by the rotation of the roll, and a third category comprising crushed grapes, skins and other debris which adhere to the roll and which are removed from it by a scraper. The grapes of the first category are directed towards a densimetric bath. The ripest grapes drop to the bottom of the tub and are picked up by a vintage pump, whereas the less ripe grapes and light debris remain on the surface, are evacuated with the components of the second and third categories.

A major drawback of such a technique is a qualitative insufficiency of the result obtained. Another notable drawback is the slowness of the process and low productivity which are incompatible with the large quantities of grapes harvested by modern harvesting machines, and the unfavorable repercussions on the cost of the wines produced exclusively from the selected grapes which are healthy, ripe and whole.

One goal of the present invention is to propose a sorting machine which permits to discriminate efficiently between the components of the grape harvest and to select from them the ripe, healthy and whole berries, at cadences compatible with the quantities of grapes harvested by means of harvesting machines, including the high-performing ones, or by mechanical harvesting processes of very high quality.

The sorting machine according to the invention is of the type which includes a feeder system conveying product to be sorted and which is unloaded at the downstream end of said feeder system, and which are differentiated by a vision system.

Such a device is for example described in the document EP-O 932 456 which describes a sorting apparatus comprising a sorting station and distribution conveyor that is steeply inclined towards said sorting station for transporting to the latter a flux of product to be sorted, from which conveyor the product is ejected when it arrives at the lower drop-off end and is being categorized during its free fall. The differentiating system comprising means to illuminate the product, means to analyze the light reflected by the product, and means to eject the product.

Document EP-O 705 650 describes a comparable sorting device featuring a conveyor belt dumping the transported product in the action zone of a sorting station operating during the free fall of the product and including an optic color sensor to optically detect the color of said product and an evaluation system to evaluate whether the color detected by the color sensor is or is not a predetermined color and to produce a differentiation signal according to the result of the evaluation, said sorting station including also an ejector that operates in response to the differentiation signal of said evaluation signal in order to modify or not the trajectory of the falling product.

The devices described in documents EP-O 932 456 and EP-O 705 650 are intended to eliminate foreign matter from the flow of product presenting itself in the form of grains or dry seeds such as: coffee beans, grains of rice, peas, hazelnuts, peanuts, plastic grains or similar products, by using differentiation systems based on the analysis of the color of the products constituting the flux to be sorted. These devices and systems are totally incapable of performing a qualitative separation of small fruit presenting itself in the form of juicy berries and of spherical shape, which actually have a tendency of aggregating together because of the sticky nature of their juices which are produced during the harvest or the de-stalking.

BRIEF SUMMARY OF THE INVENTION

The possibility to obtain such a qualitative separation in the particular case of juicy berries is precisely an essential aim of the present invention.

According to the invention, this result is obtained, owing to a selective sorting berry-harvesting machine, in particular of picked grapes which may be composed of healthy, ripe and whole berries, or unripe or shattered berries, of overripe or botrytized berries, of crushed or burst berries, of stalks or stalk fragments, of leaf-stalks or fragments of leaf-stalks, of miscellaneous debris and sticky juice. The machine comprises: a supply system suitable for feeding a vision system; a vision system that comprises: an artificial vision device which permits to acquire images of the components of the harvest delivered by the supply system; and a treatment device suitable for analyzing these images in order to recognize the components of the harvest and to differentiate between them on the basis of pre-established criteria; and a selective system for separating healthy, ripe and whole berries from other harvest components. Said selective system being controlled by the treatment system, the supply system being configured to permit spreading the harvest in a single layer, align, individually isolate and displace the components of the harvest, in a rectilinear movement at a regulated speed, in order to let said components of the harvest pass individually through the vision system, the latter being configured so as to individualize and locate in space each element in order to control the selective separation system.

Such a machine is advantageously adapted to the treatment of berries sticking to each other.

According to another characteristic of the invention, the components of the harvest are ejected at the exit of the supply system in order to be analyzed by the vision system during free fall.

According to another characteristic of the invention, the plane of all the optic lines of the vision system is positioned as closely as possible to the downstream end of the supply system.

This allows advantageously limiting the dispersion of the ejected berries.

According to another characteristic of the invention, the plane of all the optic lines of the vision system is located at a distance from the downstream end of the supply system that is at least equal to the caliber of the largest typical object of the components of the harvested crop.

According to another characteristic of the invention, the plane of action of the selective separation system is located at a distance (b) of the plane of all the optic lines of the vision system at least equal to: $b = Xobj + Tr \times Vc$, where:

Xobj: caliber of the largest typical object of the components of the harvested crop, Tr: system response time, and Vc: supply conveyor speed.

According to another characteristic of the invention, the plane of all the optic lines of the vision system is essentially perpendicular to the average trajectories of the components of the crop delivered by the supply system.

According to another characteristic of the invention, the supply system comprises a horizontal or essentially horizontal supply conveyor the bearing surface of which is fitted to move the crop components through a number of separate and parallel lanes, in the direction of its downstream end from where said crop components are ejected in free fall. This orientation of the conveyor prevents the spherical or essentially spherical berries from rolling forward or backward in relation to the travel direction of the conveyor.

According to another characteristic of the invention, the regulated speed of the supply system is in sync with the acquisition speed of the vision system in order to produce an only minimally distorted image constituted by essentially square pixels.

This synchronization facilitates advantageously the further processing of the acquired images.

According to another characteristic of the invention, the supply conveyor moves at a speed between 1.5 and 4 m/sec.

This characteristic allows advantageously ejecting the berries at the drop-off end of the conveyor.

According to another characteristic of the invention, when the speed of the supply conveyor is, for example, equal to 2.4 m/s, one has an acquisition time of the vision system of 300 µs, 1380 pixel resolution of the vision system and a width of the acquisition zone of the vision system of 1 m.

According to another characteristic of the invention, the effective length of the supply conveyor is between 0.5 and 2.5 m.

This length enables advantageously good immobilization of the bouncing or rolling crop components on the conveyor surface.

According to another characteristic of the invention, the return roll of the supply conveyor presents a diameter that is as small as possible, in order to prevent the crop components from sticking to the exit of the supply conveyor.

According to another characteristic of the invention, the supply conveyor is constituted by a cord conveyor winding around at least two grooved rolls and with an active upper surface constituted by a number of parallel strands.

According to another characteristic of the invention, the cords are tensioned at 4 daN+/−10%, with a corresponding elongation of 1%.

According to another characteristic of the invention, the cords feature a cladding of rough polyurethane which encloses a braided polyester core.

According to another characteristic of the invention, the cords have spikes on their surface or ripples forming an exterior relief.

According to another characteristic of the invention, the space or step which separates two adjacent parallel strands of the upper surface of the supply conveyor is less than the average diameter of healthy and whole berries and is sufficiently large to let juice or foreign objects of small dimensions pass through.

This characteristic permits advantageously to presort certain crop components.

According to another characteristic of the invention, the supply conveyor includes also at least one third grooved roll positioned at a distance below the active surface in order to move the cords away from the active surface and to clear a space suitable for accepting a receptacle for the crop components passing through the cords at the level of the active surface.

According to another characteristic of the invention, the supply conveyor also comprises at least one intermediary grooved roll positioned between the two grooved rolls and above the plane defines by the two grooved rolls in order to tension and support the cords on the active surface level.

According to another characteristic of the invention, the transporting surface of the supply conveyor is constituted by a number of independent cord rings.

According to another characteristic of the invention, each cord ring is buckled by means of a joint the section of which is included in the diameter of the cord.

Such a device advantageously permits a realization of endless rings wrapping well around the grooved rolls.

According to another characteristic of the invention, the supply system includes also an oblique conveyor positioned upstream of the supply conveyor and the active surface of which features a movement from the bottom to the top, in opposite direction to the falling movement of the crop poured on said oblique conveyor the active surface of said oblique conveyor being smooth or equipped with cleats.

According to another characteristic of the invention, the active surface of the oblique conveyor presents an adjustable slant in the range of between 45 and 55° in relation to the horizontal and a speed ranging from 0.05 and 0.3 m/sec.

According to another characteristic of the invention, the oblique conveyor also comprises a means of cleaning suitable for removing from the oblique conveyor those crop components that may have gotten stuck on said active surface.

According to another characteristic of the invention, the supply system also comprises a vibrating shovel positioned between the oblique conveyor and the supply conveyor.

According to another characteristic of the invention, the active surface of the vibrating shovel comprises a first slanted plane positioned under the oblique conveyor and essentially parallel to the latter, and a second slanted plane with a pitch in relation to the horizontal ranging between 0 and 10°.

This characteristic, together with the vibration, advantageously permits a good spreading of the crop and enables a gentle placement of the round berries on the supply conveyor, preventing said berries from rolling backwards.

According to another characteristic of the invention, the supply system features at least one device for separating and recovering juice from the other crop components.

According to another characteristic of the invention, the vision system comprises an artificial vision device constituted by an image acquisition device (dot lines or dot matrix), for example, one or several line cameras or array cameras, for recording the image of the berries and foreign objects to be sorted, during their movement, and a lighting device to light the crop components during the image acquisition, including a projector constituted by one or several wide visible spectrum halogen lamps, focused or not, or by a projector with white or RGB (red, green, blue) LEDS, or by a laser beam scanning system, or by another light source with particularly pertinent visible light waves to determine a differentiating criterion, positioned in the same plane as the optical line assembly of the artificial vision device.

According to another characteristic of the invention, the vision system also comprises a contrast field positioned in the background of the crop components and oriented perpendicularly to the optical axis of the artificial vision device.

According to another characteristic of the invention, the contrast field is constituted by a rotational cylinder turning at high speed in order to eject the juice and other crop components that may be sticking to its surface.

According to another characteristic of the invention, the contrast field presents a color that is absent or barely present in the color of processed berries of the various crop types.

The rotation of the cylindrical contrast field presents the dual advantage of cleaning said contrast field and of limiting in this way, in the acquired image, the length of time a possible residual stain may be present and thus the risk of the stain being mistaken for a crop component. According to another characteristic of the invention, the selective system for separating the healthy, ripe, and whole berries from other crop components is constituted by at least one bank of pneumatic nozzles, preferably controlled by ultra-rapid solenoid valves, their number matching the number of parallel alignments of crop berries on the active upper surface of the supply conveyor, each of said pneumatic nozzles being positioned in a vertical plane passing through the middle of a berry alignment.

According to another characteristic of the invention, the sorting machine features at least two banks of superposed pneumatic nozzles.

According to another characteristic of the invention, the pneumatic nozzles are aligned with the optical lines of the artificial vision device, to compensate for lack of parallax.

According to another characteristic of the invention, the vision system is organized in the form of a compact assembly or box-type structure housing the image acquisition device and the lighting system, this box-type structure being equipped, on the one hand, with a closing shutter to protect the vision system, this closing shutter closing automatically when said system is being shut down and, on the other hand, with a ventilator a source of compressed air to put said box-type structure in overpressure in order to create an airflow exiting at the level of said closing shutter.

This offers the advantage of protecting the optical and/or lighting equipment from any possible projectiles coming from the harvested crop.

The invention concerns also a sorting chain featuring a sorting machine in accordance with one of the previous modes of construction that can be constructed as a mobile, self-propelled or towed installation, or as a stationary installation.

According to another characteristic of the invention, the sorting chain features a means for dumping the crop to be sorted onto the upstream part of the supply system controlled by the sorting machine in order to adjust the feed rate to the capacity of the sorting machine.

BRIEF DESCRIPTION OF THE DRAWINGS

The afore-mentioned aims, characteristics and advantages and still others, will become clearer from the following description and the attached drawings in which.

Reference to said drawings is made to describe interesting, although by no means limiting examples of realization of the sorting machine and of the sorting chain according to the invention.

DETAILED DESCRIPTION OF THE INVENTION

Figure 1:
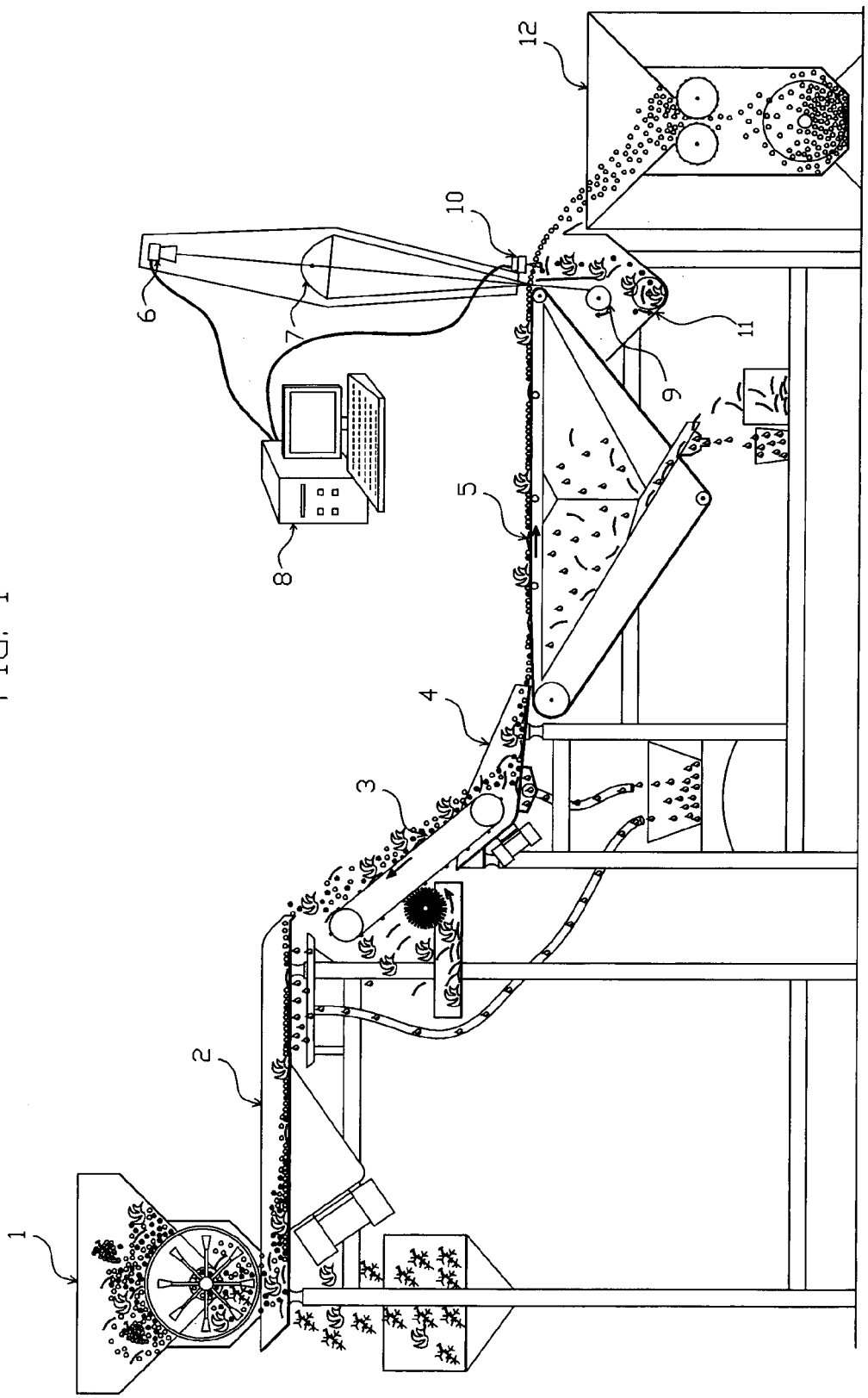
FIG. 1 is a schematic view illustrating an example of the configuration of the sorting chain according to the invention, including a sorting machine according to the invention and shown while in operation.

FIG. 1 shows a sorting installation or chain which comprises a sorting machine according to the invention. In reference to this figure, the selective sorting machine is suitable for sorting a crop of berries, in particular a crop of stripped grapes. This crop may include healthy, ripe and whole berries, immature or shattered berries, overripe or botrytized berries, or crushed or burst berries, leaves, stalks or stalk fragments, leaf-stalks, or various debris and sticky juice. This sorting machine includes a supply system 3, 4, 5, a vision system 6, 7, 8, 9, and a selective separating system 10 for the healthy, ripe and whole berries from the other crop components. The supply system is capable of feeding the vision system. The vision system includes an artificial vision device 6 enabling the acquisition of images of the crop components coming from the supply system, and a processing device 8, capable of analyzing these images to recognize the crop components and to differentiate them on the basis of pre-established criteria, by controlling the selective separating system 10.

The supply system is fitted so it can spread out the crop in a single layer, and align, isolate individually and to transport the crop components, in a rectilinear movement at a set speed, in order to pass said crop components individually through the vision system.

The vision system is configured to individualize and spatially locate each element in order to control the selective separating system 10.

The supply system 3, 4, 5 is fed with the crop, preferably de-stalked by a stalk separator 1, known as such. The stalk separator 1 may be constituted by different types of grape stemmers or strippers known as such. FIG. 1 shows a grape stemmer 1 with an open-worked rotating cylindrical cage inside of which is mounted a rotating toothed cylinder with metal stalks in a spiral arrangement on a rotary shaft; this grape stemmer 1 is equipped with a feeding hopper into which the raw harvested crop is poured.

The grape stemmer 1 is preferably installed at the front end of the sorting chain, but it may be placed at other locations along said chain, upstream of the sorting machine. It may be mounted on the harvesting machine, or on vehicles transporting the crop to the place where it is processed.

The supply system may be fed directly by the grape stemmer 1. It is also possible to insert, as an option, different types of conveyors, such as a vibrating conveyor shown in FIG. 1, between the grape stemmer 1 and the supply system 3, 4, 5.

The supply system 3, 4, 5 prepares the crop in order to facilitate its analysis by the vision system 6, 7, 8, 9. The supply system works closely together with the vision system so as to optimize the sorting of the crop.

According to a preferred and advantageous mode of execution of the invention, the supply system is such that the crop components are ejected at the exit or downstream end of said supply system, in the flow direction of the crop, for example from left to right on FIG. 1. The crop components thus leave the supply system in the direction of the analysis area of the vision system 6, 7, 8, 9 in free fall. The analysis during free fall permits to improve, in the first place, the separation of the crop components. In addition, optically, the analysis during free fall permits obtaining a sharper contrast between the crop components and said background which is further away.

Advantageously, the vision system is located, relative to the supply system, so that the plane of all optical lines of the vision system 6, 7, 8, 9 is essentially perpendicular to the average trajectories of the crop components coming from the supply system 3, 4, 5. Such an arrangement allows an optimal passing of the crop components and hence a good analysis by the vision system.

Depending on the specificity of the crop, namely that it contains a sugary juice which makes the various components of the latter stick together, variable stickiness of these components is possible at the exit from the supply system. A variation of this stickiness leads to a variation of the position, the speed or the ejection angle of the components which results in a scattering of the exit trajectories. Therefore, the ideal parabolic trajectory as shown in FIG. 1 at the exit from the conveyor 5 of the supply system is in reality a bundle of trajectories spreading out more and more as one goes away from the supply system. This is detrimental to the vision analysis which works better with a reduced depth of field.

Therefore the plane of all the optical lines of the vision system 6, 7, 8, 9 is advantageously positioned as close as possible to the downstream end of the supply system 3, 4, 5, where said scattering is most reduced.

Figure 8:
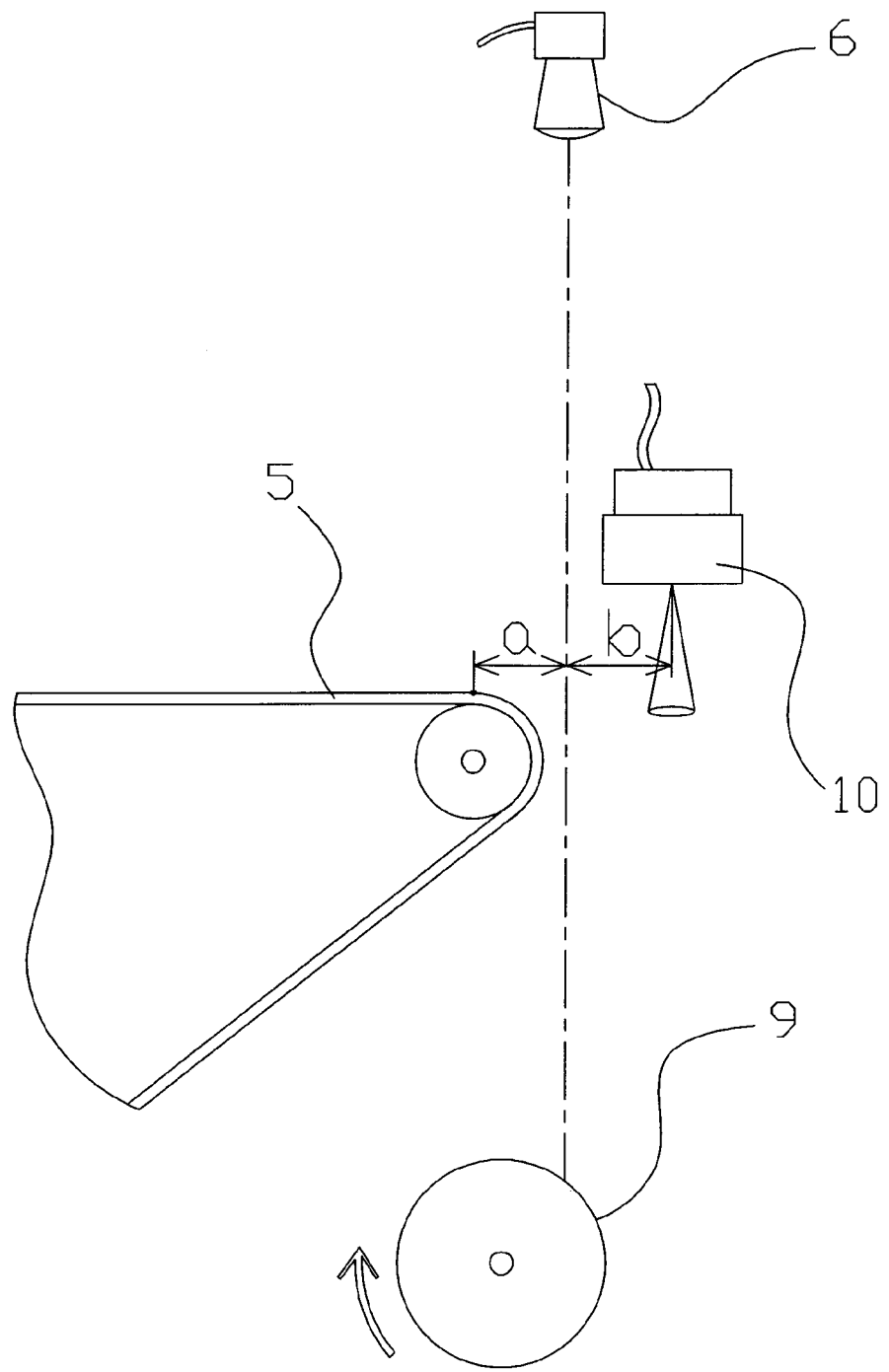

According to a preferential mode of execution, more specifically shown in FIG. 8, the plane of all the optical lines of the vision system 6, 7, 8, 9 is situated at a distance (a) from the downstream end of the supply system 3, 4, 5 at least equal to the caliber $X_{obj}$ of the largest typical object of the crop components. The downstream end is considered at the starting point of the free fall trajectory of the crop components, i.e., the point where said components leave the supply system 3, 4, 5. In this way the vision system 6, 7, 8, 9 is sure to see even the largest typical object in free fall.

The distance (a) is preferably small, so as to limit the effects of scattering of the trajectories, but at least equal to Xobj.

Comparably, according to a preferential mode of execution, more specifically shown in FIG. 8, in order to have the time to process the acquired image to determine whether an undesirable component of the crop should or should not be ejected, the action plane of the selective separating system 10 is located at a distance b from the plane of all optical lines of the vision system 6, 7, 8, 9, at least equal to: b=Xobj+Tr×Vc, where:

Xobj: caliber of the largest typical object of the crop components,

Tr: response time of the system, and

Vc: speed of the supply system.

The distance b is preferably small with a minimum value in order to take into account the time needed for processing and thus to ensure the relevance of the separation.

While referring to FIGS. 1 (overall view) and 4 (detail view), an essential component of the supply system is a horizontal or essentially horizontal supply conveyor 5 the upper bearing surface 5c of which serves to move the crop components. This essentially horizontal part or table receives the de-stalked grapes. It is clear that the flow of components, comprising berries, is dumped, on the upstream portion (on the left side of the figures) of the supply conveyor 5, in the direction of flow of the crop, and is transported up to the downstream end to be ejected there. A first longitudinal spreading of the crop is obtained by the forward movement of the conveyor.

According to an advantageous characteristic, the regulated speed of the supply system 3, 4, 5 is matched with the acquisition speed of the vision system 6, 7, 8, 9 so that the speed of the crop components when they leave the supply system, will be in relation with the acquisition or sweep speed of the vision system. The speed of the crop components and the sweep speed of the vision system are mutually perpendicular and contribute to forming an image. If these two speeds are related, which is to say essentially identical, the formed image does not suffer too much distortion and one obtains an image where the proportions have been preserved, what the expert still calls square pixels. If it is possible to perform the image processing with rectangular pixels, the square pixels provide an advantageous simplification of image processing.

The set speed of the supply system 3, 4, 5 is matched with the acquisition speed of the vision system 6, 7, 8, 9 in order to produce an image including square pixels when Vc=Va=(Lc/Np)×(1/Tacq), where:

Vc is the speed of the supply system,

Va is the acquisition speed of the vision system for one pixel,

Lc is the width of the acquisition zone of the vision system,

Tacq is the acquisition time of the vision system per line, and

Np is the resolution of the vision system, in number of pixels per line.

The bearing surface 5c is organized in the form of a number of separated and parallel lanes. In this way the berries are distributed over a number of lanes or parallel alignments. This contributes to obtaining a second transversal spread of the crop. One obtains in this manner, an advance according to a uniform, rectilinear movement of the berries and foreign objects. They do not cross each other and move all at the same speed. Transporting the berries and other small debris by way of separate lanes, all the way to their drop-off point, allows to create a space between the components of the flow dumped at the end of the conveyor 5 and thus to view them individually. The objective is thus to suppress agglomerations of components sticking to each other and more difficult to process by the vision system.

The longitudinal forward speed of the surface of the supply conveyor 5 has a dual function. The first function is the longitudinal spread of the crop in order to separate its components. For a given spread it is possible to adjust either the speed or the flow of the harvested grapes deposited on it. A second function of the speed is the ejection of the crop components at the downstream end of the supply conveyor 5. To ensure for the berries sticking together to come unstuck and to eject them towards the vision system, it is advisable to transmit to these berries, by means of conveyor 5, an initial speed at least equal to 1.5 m/sec, this speed being in the range between 1.5 m/sec and 4 m/sec. By increasing this speed one can increase the processing rate of the crop, while it does remain limited by the acquisition and image-processing capabilities of the vision system. Beyond 4 m/sec the vision system is unable to keep up with the rate within economic technologies.

It has previously been indicated that the supply speed Vc which corresponds to the speed Vc of the conveyor 5, is advantageously correlated with the acquisition speed of the vision system, in order to obtain square pixels. For an image acquisition time of Tacg=300 µs, a resolution of the vision system of Np=1360 pixels and a width of the acquisition zone of the vision system, which here merges with a width of the conveyor, Lc=1 m, a speed of the supply conveyor 5 equal to Vc=2.4 m/sec make it possible to obtain square pixels, while ensuring good ejection of the berries.

One will see, in the following that the supply conveyor 5 can be fed by different devices. In all cases, the crop is dumped on the bearing surface or active surface 5c. This dumping can create a rolling motion or backward motion of the sphere-shaped berries, as well as vertical bouncing movements due to the elasticity of the bearing surface 5c and/or the berries. In order to suppress or to retain a possibility of damping these interfering movements of the crop components, it is advisable to have available a certain working length of the bearing surface 5c of the supply conveyor 5, this length being preferably between 0.5 m and 2.5 m. A minimum length of 0.5 m has thus been experienced. A preferential value of 1.5 m beyond which the majority of berries are stabilized, has been retained. A length of the bearing surface 5c exceeding 2.5 m brings no benefit, increasing unnecessarily the space requirement of the machine or of the sorting chain incorporating such a machine.

Figure 4:
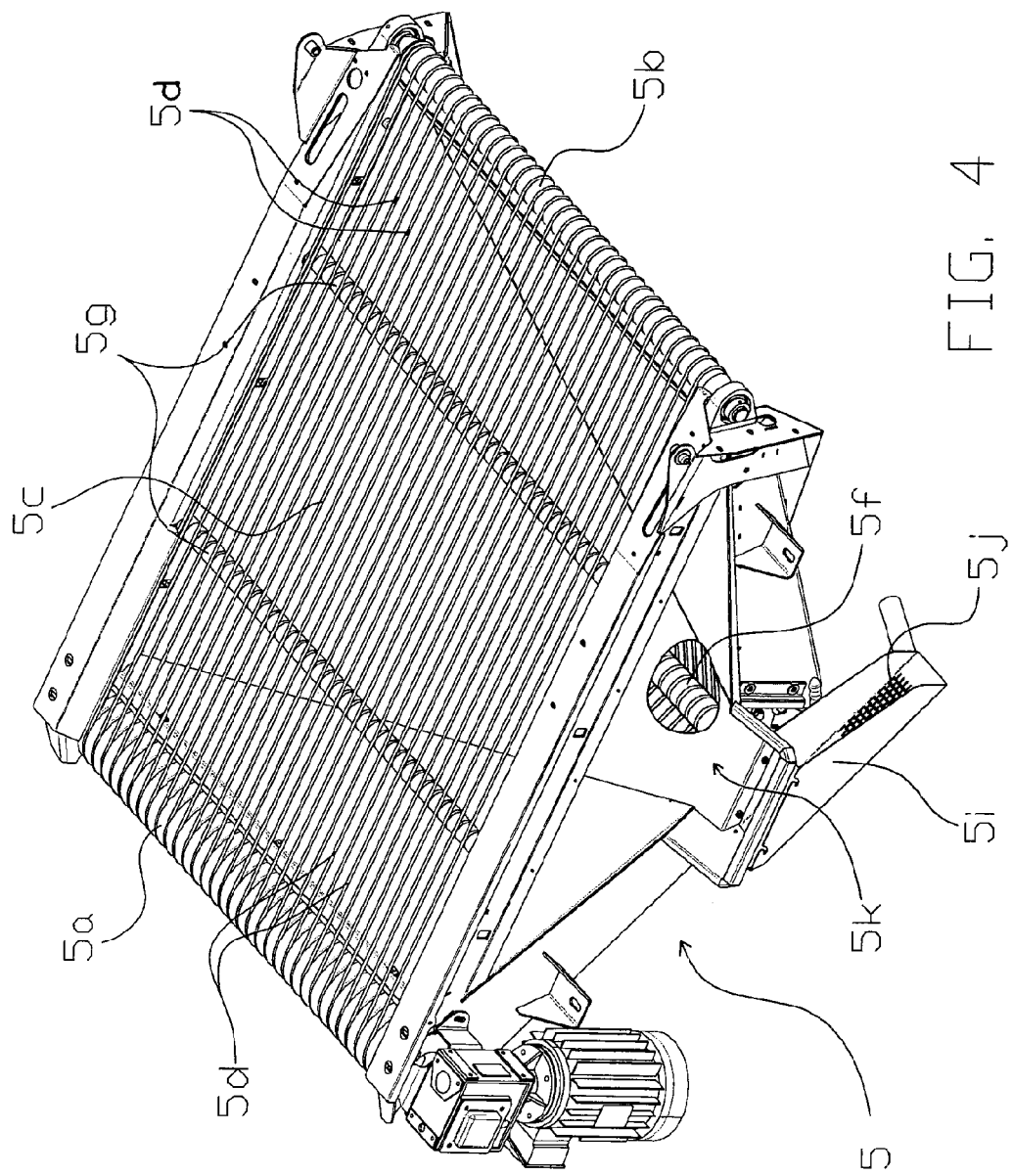
FIG. 4 is a perspective view of a supply conveyor according to the invention.

Referring to FIG. 4, the conveyor 5 presents a transporting belt with a bearing surface 5c. This belt is wound around an upstream roll 5a and a downstream roll 5b and carries the crop from left to right. The crop components are ejected in the area of the downstream roll 5b. In order to limit the risk of stickiness in the area of the exit end of the supply conveyor 5, at the time of ejection, the downstream roll 5b has the smallest diameter possible. It is preferable for the radius of this roll to be less than the caliber Xobj of the largest typical object of the crop components. However, the mechanical aspect of this roll, particularly in order to withstand the tension of the belt, requires a minimum diameter. A diameter of 30 mm is suitable to meet this condition. A diameter of 60 mm still ensures satisfactory ejection. In order to meet this constraint of a reduced diameter of the downstream roll 5b, the drive roll is advantageously the upstream roll 5a.

Still with reference to FIG. 4, according to a particularly advantageous mode of execution, the supply conveyor 5 is constituted by a conveyor with cords which are wound around at least two grooved rolls 5a, 5b, and where the active upper surface 5c or bearing surface includes a number of parallel strands 5d.

The use of cords, by limiting the surfaces of contact with the berries, permits reduction of the effect of adhesion of the sticky berries, during their transportation and especially at their ejection in the area of the downstream roll 5b. The cords participate also in the cross-spreading function and the guidance in parallel lanes. Finally the cords create an open-strand belt to let small debris and juice drop down between the cords. Each strand 5d forms, together with an adjacent strand, a mobile lane 5e, so that the active upper surface 5c is constituted by a number of mobile parallel lanes 5e, and so that the berries spread out on said active upper surface move along a pattern of parallel alignments.

The cords are advantageously tensioned to 4 daN±10%, with a corresponding elongation of 1%. This tension may advantageously be created by an automatic tension device, for instance through the intermediary of a tensioning device, a spring, a pneumatic pressure-adjusted jack or by any other elastic device.

Figure 5:
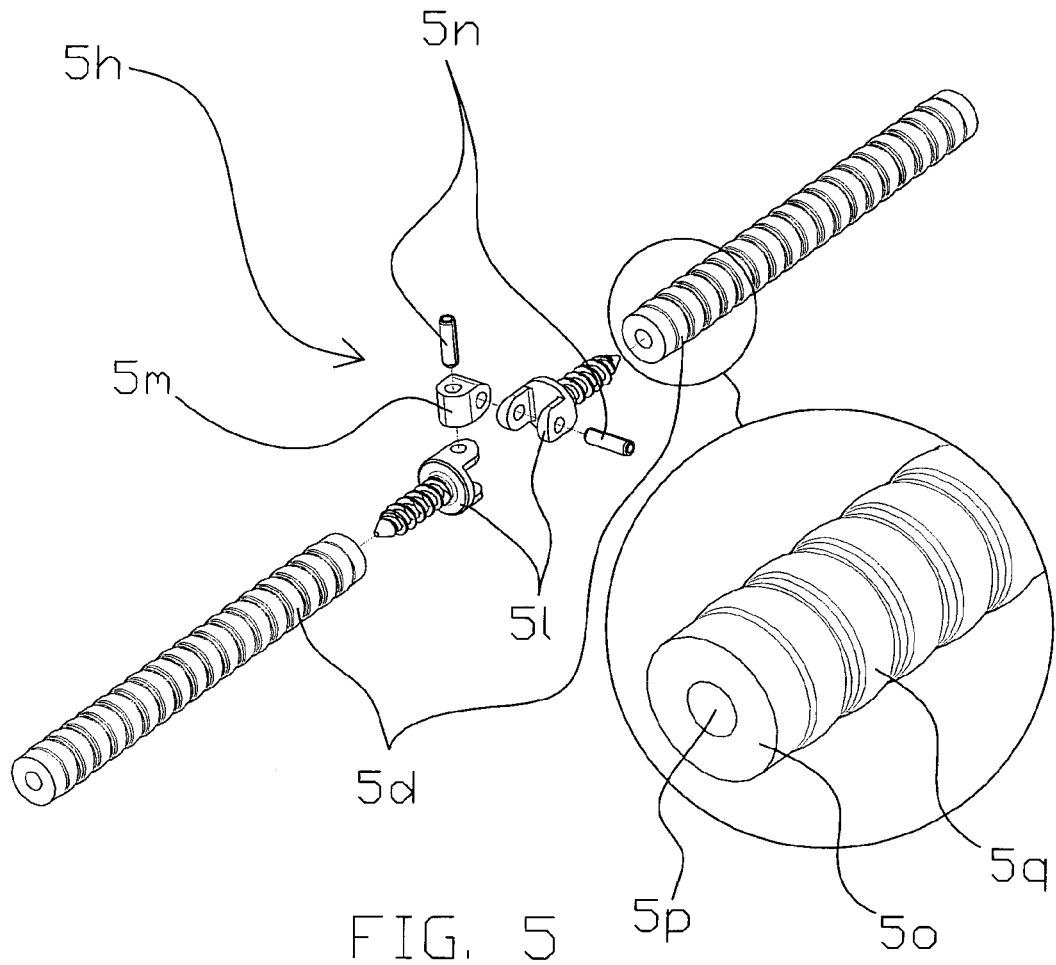
FIG. 5 is a perspective detailed view, with a cutaway, of a miniature cardan joint advantageously used to fasten the cord ring(s) of the supply conveyor.

Referring to FIG. 5, in order to properly draw the berries along as they rest between two parallel strands 5d, the cord is advantageously roughened. An advantageous composition features a sleeve 5o of rough polyurethane. To ensure durability under tension, the core 5p of the cord is advantageously made of braided polyester.

Figure 6:
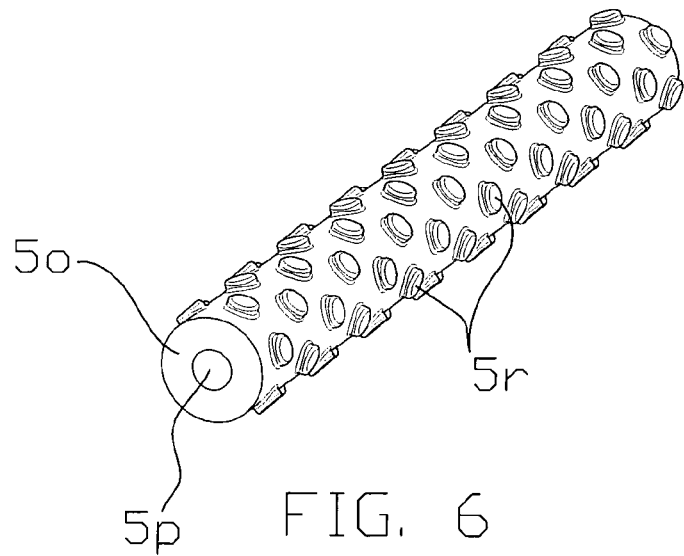
FIG. 6 is a perspective detailed view of an alternative mode of realization of a cord.

According to a preferred mode of execution, shown in FIGS. 5 and 6, the cords 5d advantageously present spikes 5r (FIG. 6) or ripples 5q (FIG. 5) forming an outside relief. In this way the crop components can be drawn along more easily. This also reduces the back-roll of the berries and thus accumulations of components. In fact, the round berries, as they roll backwards, tend to press themselves against the stickier components which put themselves quickly at the speed of the conveyor. Such roughness of the cords 5d, as it improves the efficiency of various functions of the supply conveyor 5, allows advantageously reducing its length.

Figure 10:
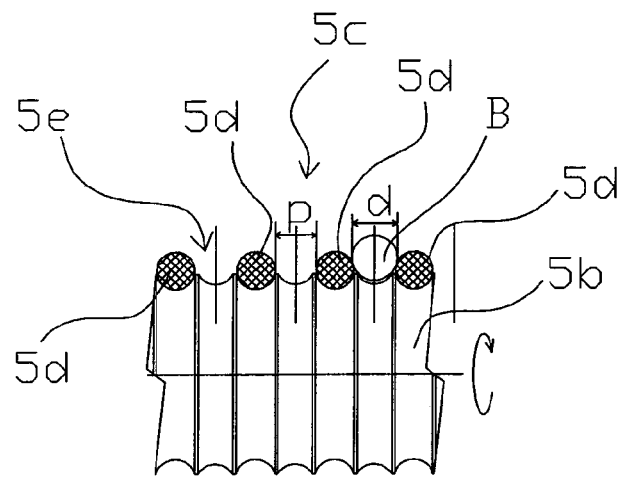
FIG. 10 is a detail front view and at an enlarged scale, showing the lateral guidance of the berries in the mobiles lanes of the supply conveyor.

Referring to FIG. 10, showing a section of the cords in the area of a roll 5a, 5b, the space or step p which separates two adjacent parallel strands 5d of the active upper surface 5c of the supply conveyor 5, is less than the average diameter d of healthy and whole berries B. On the other hand, the space or step p is sufficiently large to let pass the juice and/or foreign objects that might be included in the flow of berries being transported by said conveyor 5.

According to an advantageous mode of execution, shown in FIGS. 1 and 4, the supply conveyor 5 also comprises at least one third grooved roll 5f in addition to the two rolls 5a, 5b. This roll 5f is located at a distance under the active surface 5c in order to remove the cords of said active surface 5c, for example in the shape of a triangle. This allows to create a space suitable for receiving a receptacle 5k or a device 5i, 5j, 5k recovering the crop components (debris, juice) passing through the cords on the level of the active surface 5c.

According to an advantageous mode of execution, the supply conveyor 5 comprises also at least one intermediary grooved roll 5g situated between the two grooved rolls 5a, 5b. This roll is situated under the strands 5d and slightly above the plane which is defined by the two grooved rolls 5a, 5b in order to tension and support said strands 5d of cord on the level of the active surface 5c. This permits to tension the cords locally in order to prevent or limit a bounce of the berries.

According to a first mode of execution (not shown) the transporting belt of conveyor 5 is constituted by a single endless cord wound around the pair of grooved rolls 5a, 5b, the opposite ends of this winding being joined together by a portion of cord circulating diagonally below the return portion of said transporting belt. This return portion can be used to obtain the constant tension of all the strands 5d of the transporting belt 5. This arrangement facilitates installation of the conveyor and cleaning of the transporting belt. It also permits to get the same tension for all the bearing strands 5d of the transporting belt.

According to a second preferred mode of execution, the transporting belt of the supply conveyor 5 is constituted by a number of independent cord rings. These rings present essentially the same length and are tensioned simultaneously, for example by means of a tensioning roll.

According to a particularly advantageous characteristic, shown in reference to FIG. 5, the single loop of cord in the case of the first mode of execution, or every cord ring in the case of the second mode of execution, is fastened by means of a joint 5h the section of which is included in the diameter of the cord. Interestingly, this joint 5h may be removable. It may for instance be constituted by a miniature cardan joint. This cardan joint 5h is such that over its entire length, its section remains in the extension of strand 5d and included in the cylinder defined by the diameter of said strand 5d. This cardan joint 5h includes two clevises 5l assembled by means of pins 5n via a spindle spider 5m. Said clevises 5l are extended by screws. These screws are screwed into the core 5p of strand 5d. The polyester braid permits such a screwed joint. Such an assembly with a cardan joint 5h, or other removable joint the section of which is included in the diameter of the cord, allows the strands advantageously to wind around the grooves of rolls 5a, 5b, 5f, 5g regardless of the angular orientation of strand 5d around its axis.

The sorting machine according to the invention can function with supply system featuring only one supply conveyor 5. In this case the de-stalked crop is directly dumped on the conveyor 5, for instance directly by the grape stemmer 1 or via an intermediary means 2.

According to an advantageous configuration, the supply system also includes an oblique conveyor 3. This oblique conveyor 3, as shown in FIG. 1, is positioned upstream of the supply conveyor 5, receives the discharged crop and then delivers it directly to the supply conveyor 5. The oblique conveyor 3, shown in detail in FIG. 2, has an active surface 3c which experiences a movement from the bottom to the top, in the direction opposite to the drop-off movement of the crop as it is dumped on the active surface 3c of said oblique conveyor 3. This inverse movement reduces the speed of the crop components which then arrive on the supply conveyor 5 with less movement, thus avoiding or reducing the possible bounce, roll or back-roll of the berries.

The oblique conveyor 3 constitutes a device which permits regulating the flow of harvested products and to spread this flow over a width corresponding to the width of the supply conveyor 5.

According to a very interesting arrangement of the invention, the inclined oblique conveyor 3 also allows for elimination of a significant percentage of long and thin debris (leafstalks, fragments of leaves and twigs, small branches) that remain intermingled with the berries after the crop has gone through the grape stemmer 1. The oblique conveyor 3 contributes also to the uniform spread of the grape harvest in a single layer, on the horizontal active surface 5c of the supply conveyor 5. As shown on FIGS. 1 and 2, it is positioned with an incline between 45° and 55°, with a preferential incline of 45°. Thus, the upper part is situated under the discharge of the means 2 or the grape stemmer 1, whereas its bottom end is positioned above the upstream portion 5a of the supply conveyor 5.

To perform its different functions, the oblique conveyor moves at a low speed in relation to that of the supply conveyor 5, advantageously in the range between 0.05 and 0.3 m/sec, with a preferential value of 0.15 m/sec.

The slant and/or the speed are advantageously adjustable, depending on the shape and quality of the crop to be processed.

Figure 2:
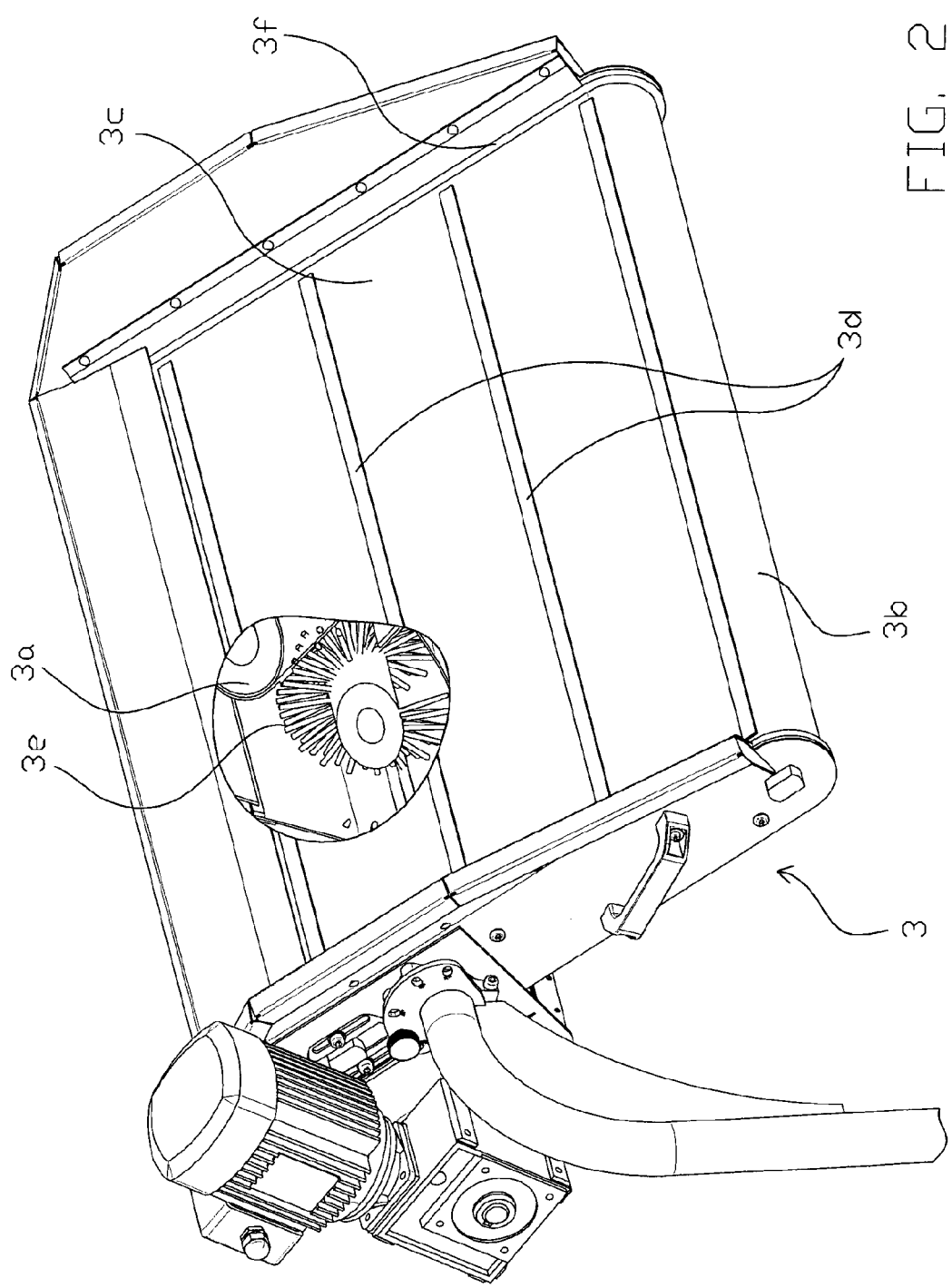
FIG. 2 is a perspective view, with a cutaway detail, of an oblique conveyor according to the invention.

Referring to FIG. 2, the oblique conveyor 3 includes an endless belt wound around at least two rolls 3a, 3b, one of which, here 3a, is driven by a motor, in a direction according to which the active side forming the active surface 3c of the belt moves slowly from the bottom to the top, that is to say in a direction is opposite to the direction of the discharge of the crop.

The exterior surface of the belt may be smooth or equipped with strips 3d positioned so as to form a succession of continuous or broken lines. During operation, pieces of long and thin debris tend to align themselves and to get hung up on the strips 3d on the ascending portion of the belt, so that they find themselves lifted up in the direction of the high end of the belt and removed from the latter once they reach said end, whereas the berries B roll on the tilted surface of said belt and drop onto the upstream part of the supply conveyor 5.

Depending on the type of more or less sticky and juicy berries and depending on their size, the exterior active surface of the endless belt 3c may be smooth or equipped with more or less high strips (in the order of 2 to 4 mm) and of a shape that is adapted to the shape of said berries and letting any juice pass through. A juice recovery device may advantageously be placed at the level of the low roll 3b.

Advantageously a cleaning device 3e is placed crosswise under the belt, against the return portion or belt of the endless belt, to provide for cleaning of the latter. This device 3e is for instance a spiral brush 3e essentially parallel to rolls 3a, 3b, rotating at high speed to clean themselves by centrifugal effect.

The width of the oblique conveyor 3 corresponds essentially to that of the supply conveyor 5.

The interface between the oblique conveyor 3 and the supply conveyor 5 may work directly or through the intermediary of a swiveling vibrating slide-shovel 4. The supply system includes advantageously a vibrating slide-shovel 4, positioned between the oblique conveyor 3 and the supply conveyor 5.

Figure 3:
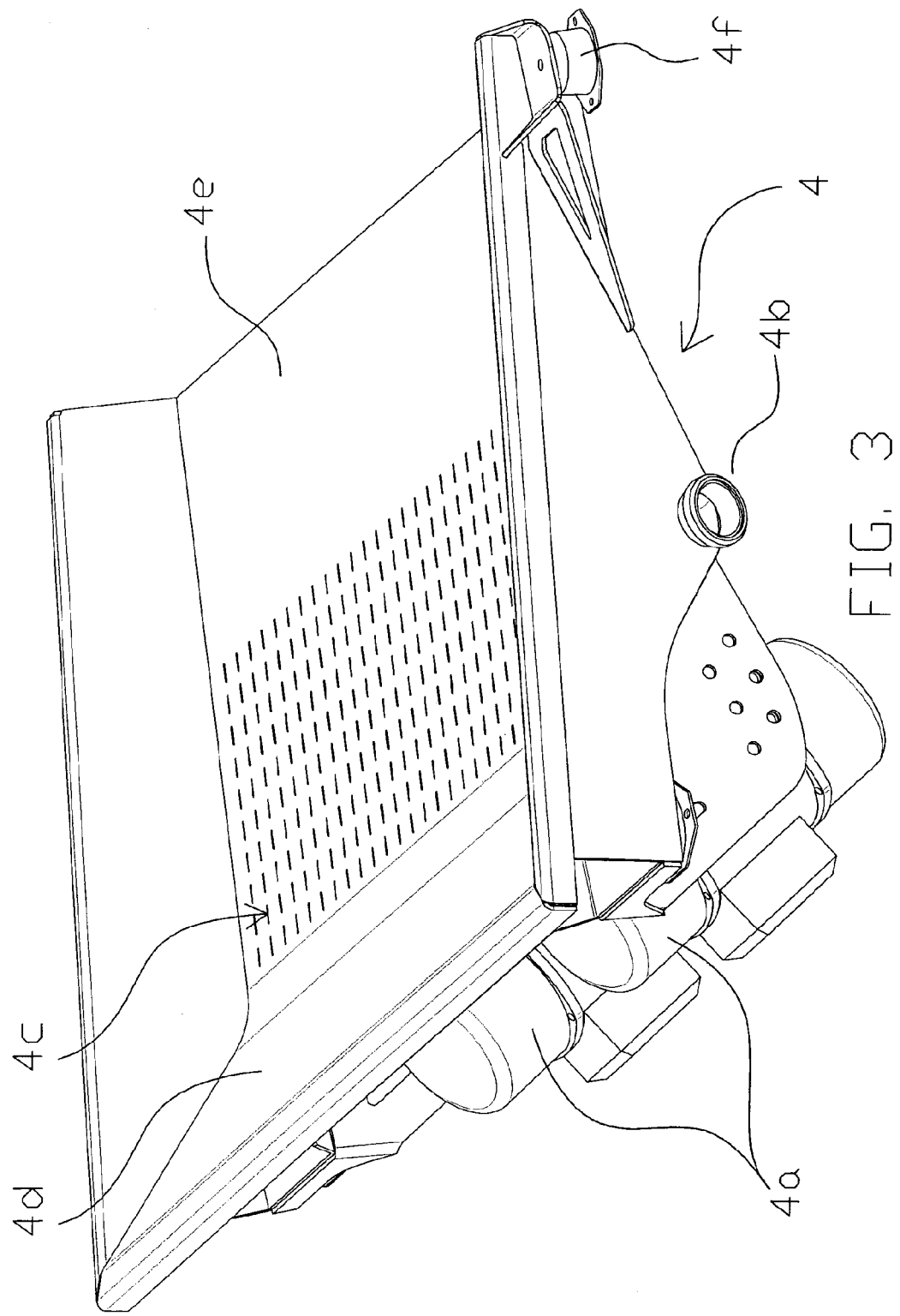
FIG. 3 is a perspective view of a vibrating slide-shovel according to the invention.

As shown in FIG. 3, such a vibrating slide-shovel 4 comprises an active surface 4c including a first tilted plane 4d and a second tilted place 4e. The first tilted place is advantageously positioned under the oblique conveyor 3 and presents an orientation essentially identical to that of the conveyor 3. The second tilted plane 4e presents an inclination relative to the horizontal ranging between 0° and 10°.

The vibration of the vibrating slide-shovel 4 fulfills the function of making the flow of harvested grapes advance on the second tilted plane. It also permits for equalizing the distribution of the harvested grapes and to break up the cluster of components sticking together. The vibrating slide-shovel assembly 4 is mounted on elastic supports 4f so as to enable the vibration motion developed by the vibrator 4a around the shaft 4b.

The inclination of the second tilted plane permits advantageously to stabilize the berries prior to their transfer to the supply conveyor 5, thereby reducing considerably the roll or the back-roll of the berries, once they arrive on the upper active surface 5c of the supply conveyor 5. This inclination is advantageously adjustable to the quality of the harvested grapes (diameter of the berries, amount of "stickiness", . . . ).

The width of the vibrating slide-shovel 4 corresponds essentially to those of the oblique conveyor 3 and of the supply conveyor 5.

According to a particular configuration, it is possible to discharge the crop directly on the tilted plane 4d of the vibrating slide-shovel 4 using a carrier trailer with a vibrating slide-shovel permitting to laterally spread the harvested grapes. In this case, the de-stalking system must be mounted on the harvesting machine.

The supply system features, as shown in FIG. 1, at least one device for the separation and recovery of juice from the other crop components. This device may be positioned in or under the active surface 5c of the supply conveyor 5, and/or in the area of the vibrating slide-shovel 4 which is advantageously perforated so as to act as a juice filter, and/or also in the area of the oblique conveyor 3.

Figure 7:
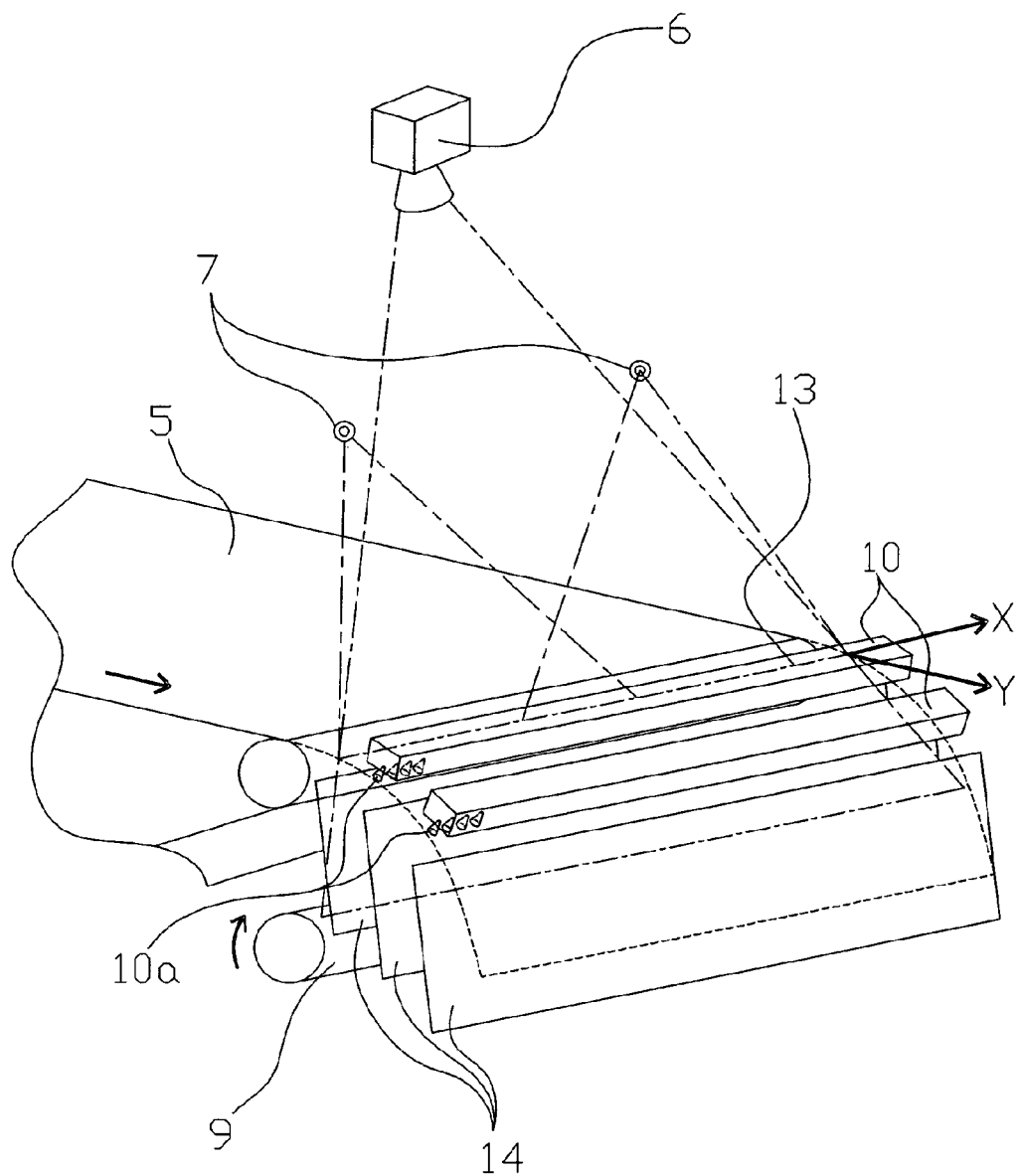
FIGS. 7 and 8 are two schematic views of the interface between the supply system, the vision system and the selective separation system.

As shown schematically in FIG. 7, the vision system includes at least one artificial vision device 6 constituted by an image acquisition device, for instance a sensor or a camera to record the image of the berries and foreign objects to be sorted during their movement. The artificial vision device 6 performing the image acquisition may be constituted by one or several line cameras or by one or several matrix cameras, or by any other suitable image sensing element. The vision system permits to see the crop components individually while in motion, especially, according to the advantageous example shown, during their free fall at the exit from the supply system.

FIG. 7 illustrates a line camera which regularly acquires an image/line at the exit of the supply conveyor 5, along the imaginary line 13. The crop components are seen not far from the downstream end of the conveyor 5, thus the trajectories in free fall the average of which is shown in a dotted lines have not yet had the time to collapse or to disperse too much. The succession of images/lines regularly acquired over time permits to reconstitute a complete image. This image has square pixels if the arrival speed of the crop components matches the frequency of image/line acquisition.

The vision system also comprised advantageously a lighting device 7 to illuminate the crop components during the acquisition of their image. This lighting device 7 may include a projector constituted by one or several wide luminous spectrum halogens, in focus or not, of a projector with white LEDs or RGB (red, green blue) LEDs, of a laser sweep system, or of another light source with a light wave length that is particularly pertinent to determine a differentiating criterion. The lighting device 7, preferably in focus, is advantageously placed in the same plane as all the optical lines of the artificial vision device 6. This permits avoiding the moon effect.

According to another mode of execution, the lighting device 7 may include several sources, preferably in focus, (upper and lower) not in the same plane as all the optical lines of the camera 6, to avoid the moon effect and create a shaded area in the optical field of camera 6.

The vision system also comprises a processing device 8 that is configured and/or programmed to analyze the acquired images and recognize the different types of crop components, perform their spatial positioning and their differentiation based on pre-established criteria of size, form of transparency and/or of color, so as to be able to separate the berries based on their condition and to control the selective separating system 10 in order to separate, on the one hand, the healthy, ripe and whole berries, and, on the other hand, the other crop components, foreign matter still present among the berries.

The processing device 8 may be built around an industrial PC or any other automaton or micro-computer known as such.

The processing device 8 receives information from the artificial vision device 6. Each element of the acquired image is individualized and positioned in space. On the basis of various parameters, for example of shape, color or any other characteristic of the berries, the processing device makes choices and commands the selective separating system 10. It is piloted by a man/machine interface which permits to freely select the sorting criteria for each ramp of the selective separating system 10.

Still with reference to FIG. 7, in order to improve the contrast of the image acquired by the artificial vision device 6, a contrasting background 9 is advantageously arranged on the optical lines of the artificial vision device 6 behind the moving crop components, especially, according to the interesting example previously described, behind the crop components ejected by the supply system 3, 4, 5. In this way a more contrasted image is obtained, improving the quality of the final image processing.

According to a preferred and advantageous mode of execution, this contrast background is made on a cylinder which rotates at high speed, between 1000 and 4000 RPM. A preferential value of 2850 RPM has been retained for an asynchronous two-pole 50 Hz motor operating on the local power grid. A roll with an 80 mm diameter provides a background that is suitable for the application.

The rotation of the cylinder presents, on the one hand, the advantage of ejecting, by centrifugal effect, the juice or other crop components, which do not fail to fall on the contrast background 9, at the risk of remaining stuck on its surface, in order to clean it, and, on the other hand, a possible element stuck on the cylinder, because of the rotation, appears on the image in a more diffuse way, through averaging in time and thus in space. The risk of confusing it with a crop component is thereby reduced.

The contrast background 9 is preferably chosen to be of a color that is rare or absent in the objects to be sorted.

The color of this contrast background 9 is advantageously determined by applying one of the following relationships:

$R/V \geq 3$ and $R/B \geq 3$; or $V/R \geq 3$ and $V/B \geq 3$; or preferably $B/R \geq 3$ and $B/V \geq 3$; where:

R=level of intensity of the color red picked up by the camera(s) of the image acquisition system;

V=level of intensity of the color green picked up by the camera(s) of the image acquisition system; and B=level of intensity of the color blue picked up by the camera(s) of the image acquisition system.

Said contrast background may be of a blue color, a color which is not or barely present in the components of the various types of harvested grapes.

Figure 11:
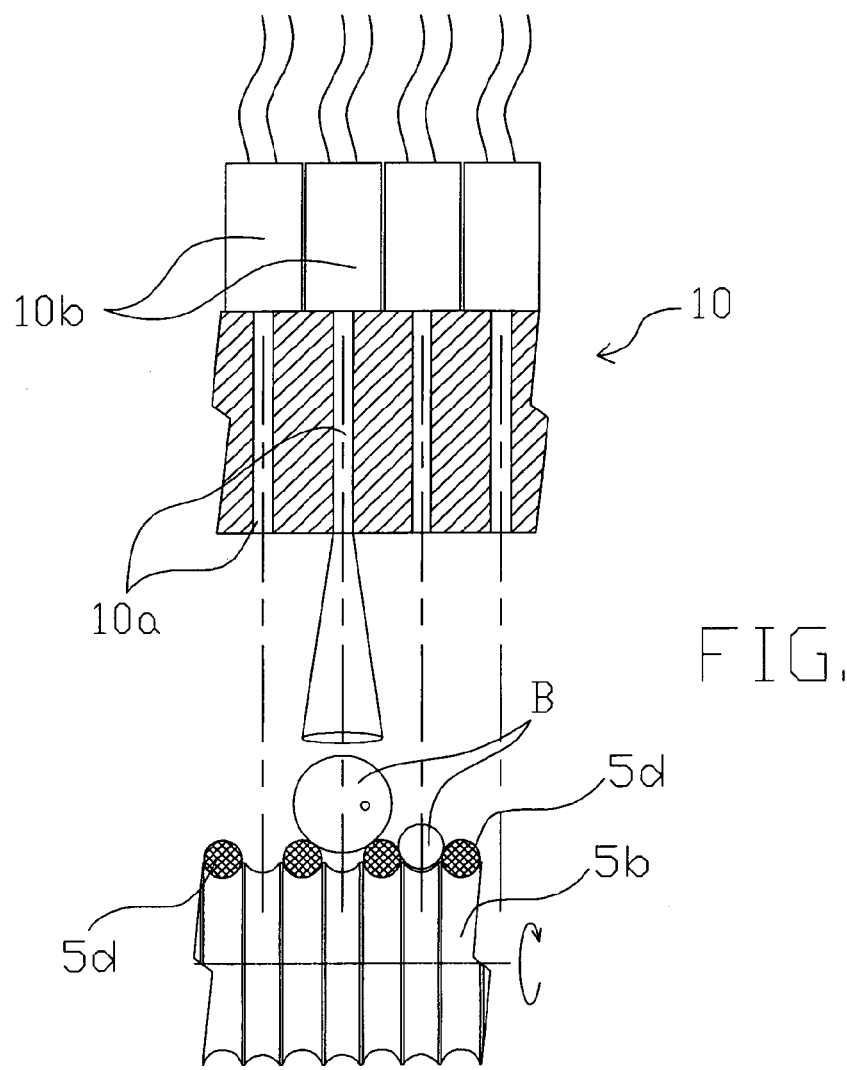
FIG. 11 is a detail view illustrating the alignment of the pneumatic nozzles with the mobile lanes of the supply conveyor.

As shown in FIG. 11, the selective separating system 10 includes a ramp with a number of pneumatic nozzles 10a, preferably controlled by ultrafast solenoid valves.

Each nozzle 10a is constructed and oriented so as to direct an air blast in the direction of the crop components, in an area where said components are in free fall, at the exit of the supply conveyor 5. The number of pneumatic nozzles 10a corresponds to the number of mobile lanes 5e defined by the parallel strands 5d of the active upper surface 5c of the supply conveyor 5 (that is to say, to the number of parallel alignments of berries of the crop) and each of said pneumatic nozzles 10a is positioned in a vertical plane passing through the middle of a berry alignment.

The vision system is capable of identifying the different crop components, recognizing at least the healthy, ripe and whole berries among the other components and locating these. Based on this localization, recognition of the speed of the components essentially equal to the speed of their ejection from the supply conveyor 5, the distance b between the vision plane and the action plane of the separating system 10, the processing device 8 knows how to determine at what instant the component to be separated passes in front of the pneumatic nozzle 10a corresponding to the mobile lane 5e containing the component to be separated. The processing device 8 can command the corresponding solenoid valve 10b accordingly, in order to blast said component, based on the type of object identified (whole berry, burst berry, foreign matter). Certain nozzles 10a blast those among them which meet predefined differentiating criteria, so as to modify their initial natural trajectory and to make them drop into a dedicated container. It is sufficient to position two separate containers, one below the nominal trajectory recovering the components receiving no blast, and another one to receiving the blasted components. It is to be noted that it is possible to command the nozzles 10a to blast either the healthy, ripe and whole berries, or, on the contrary, all the other undesirable components of the crop.

So far a sorting machine has been described which includes one single bank 10 of nozzles 10a and which performs binary sorting. According to an alternative mode of execution the sorting machine features at least two banks 10 of stacked pneumatic nozzles 10a. Two banks 10 facilitate ternary sorting. Three banks facilitate quaternary sorting, etc. In this case, flanks 14 complete the selective separating system 10. A ternary sorting example separates the healthy, ripe and whole berries destined for premium vinification, the damaged or crushed berries which can still be used for lower quality vinification, from the other undesirable components of the crop.

The supply conveyor 5 permits extracting the liquid phase and some long and thin foreign matter (such as leaf stalks) from the flow of transported objects, to channel, between the cords 5d, the berries and possibly the foreign matter still mixed in with said berries, and align said objects with the axis of the ejection nozzles 10a.

According to a first mode of execution, the pneumatic nozzles 10a are aligned with the optical lines of the artificial vision device 6, to compensate for the lack of parallax. Such a configuration permits to compensate for the dispersion of trajectories that is observable to the extent that image acquisition is performed at a distance from the downstream roll 5a of the supply conveyor 5. The objects to be sorted being heterogeneous in their shape and in their sticking effect, dispersion of the latter in relation to their theoretical trajectory may appear during their free fall. Certain objects pass further away from the pneumatic nozzles. To be sure to blast the selected objects, the pneumatic nozzles 10a are aligned with the optical lines of the artificial vision device 6 which present a certain optical acceptance angle. All pneumatic nozzles 10a are then oriented towards the focus of camera 6.

However, such a mode of execution of a bank of nozzles is tricky to carry out and consequently expensive. The previously described arrangement, namely to place the optical plane as close as possible to the downstream end of the supply conveyor 5, by reducing the dispersion of the trajectories, permits advantageously, according to a second preferential mode of execution, to use a bank 10 of nozzles 10a with parallel axes, [which is] simpler to make.

Figure 9:
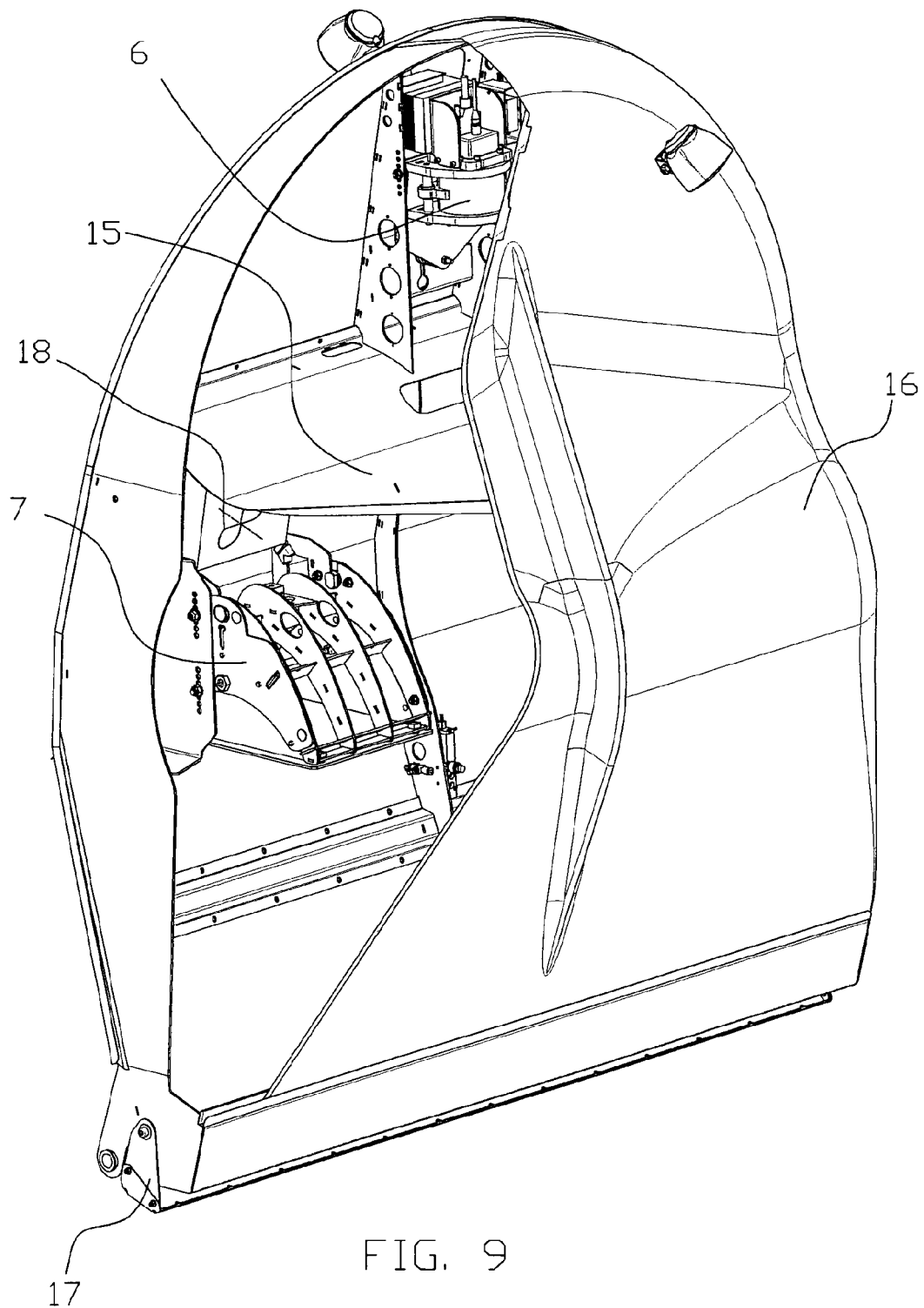
FIG. 9 is a cutaway perspective view of the vision box-type structure.

The vision system may advantageously be organized in the form of a compact assembly or box-type structure 16, such as, for example, shown in FIG. 9, housing the image collector 6 and the lighting system 7. This box-type structure 16 is advantageously equipped, on the one hand, with a closing shutter 17 which serves to protect the vision system. The closing shutter 17 closes automatically when said system is shut off, and, on the other hand, a fan 18 or a source of compressed air enables said box-type structure 16 to be put under overpressure in order to create an air stream exiting at the level of said closing shutter 17. This prevents any possible projections of juice from flowing back and from interfering with the vision, when the machine is in operation. Likewise, a cap 15 protects the sensor 6 from any possible projections. This cap 15 also serves advantageously as a deflector to direct the air flow of the fans.

On the basis of a sorting machine according to one of the previously described modes of execution, it is possible to construct a sorting chain, by adding equipment for pre- or post-processing of the crop.

Thus it is possible, for example, to add, upstream, a means for discharging the crop to be sorted on the upstream part of the supply system. The output of this discharge equipment is advantageously controlled by the sorting machine, so as to adjust itself to the output of the sorting machine. For this, a crop sensor can be positioned at the discharge equipment, so as to trigger the output upstream of the sorting machine. This sensor may be constituted by an ultrasound distance sensor or an infrared sensor.

The sorted berries or other components may be received downstream of the sorting machine into tubs, pumps, on conveyors, screw conveyors, directly into vats, or any other tank or transfer equipment.

The sorting machine according to the invention may be fed by any supply apparatus capable of spreading the crop components over the entire width of the supply system 3, 4, 5. The assembly may be interfaced with the crop receiving system, at the entrance to a cellar, in an existing sorting chain equipped with either a receiving dock, or a self-emptying or tipping trailer.

The sorting machine or chain may be stationary or mobile.

The sorting chain of the invention may feature a supervising module equipped with a man-machine interface and configured to control all elements of said processing chain and to manage their interactions.

Figure 12:
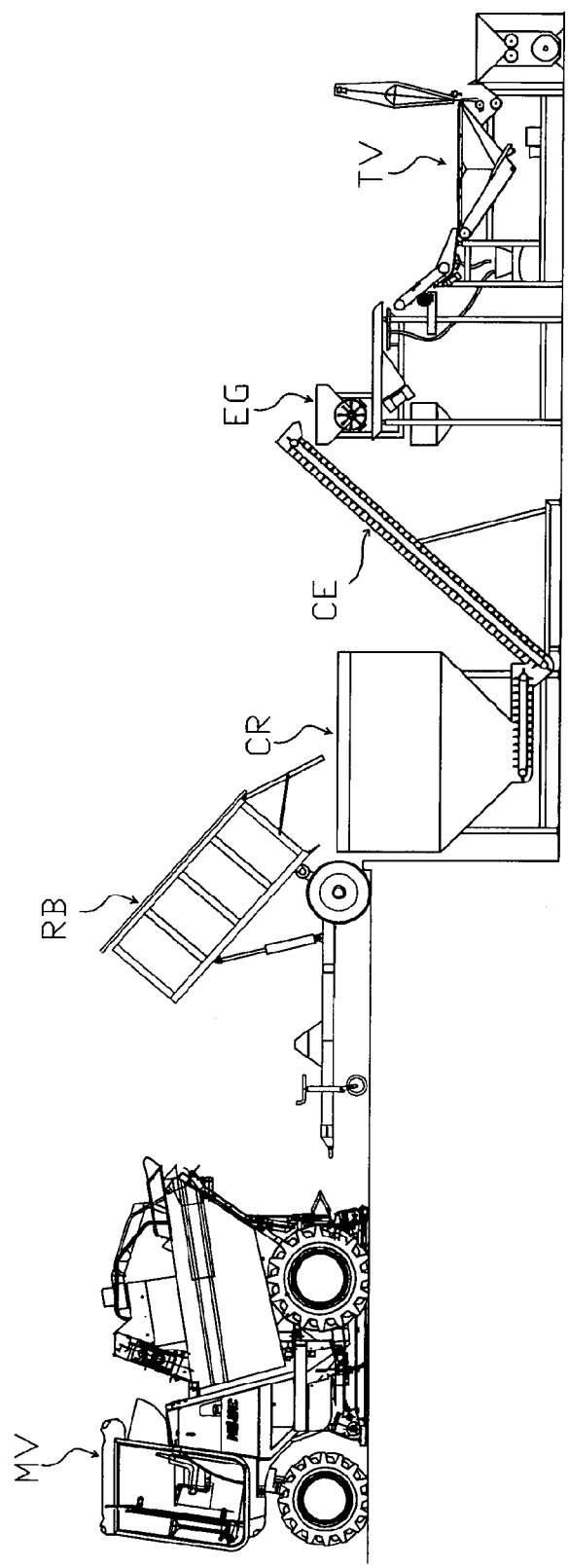
FIGS. 12, 13, and 14 are schematic views illustrating, as examples, different configurations of sorting chains utilizing the sorting machine according to the invention.
Figure 13:
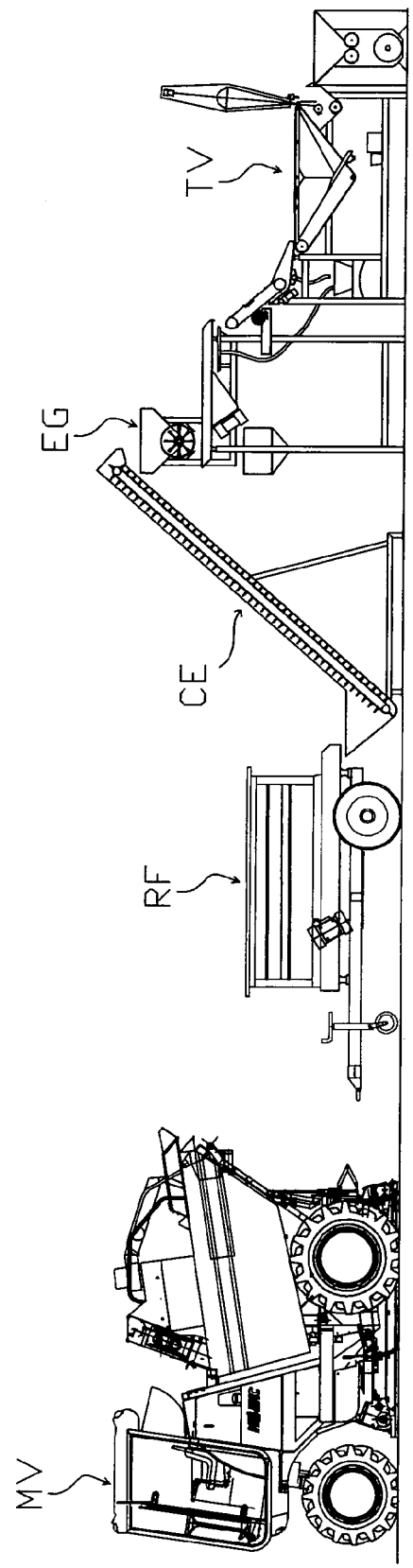
Figure 14:
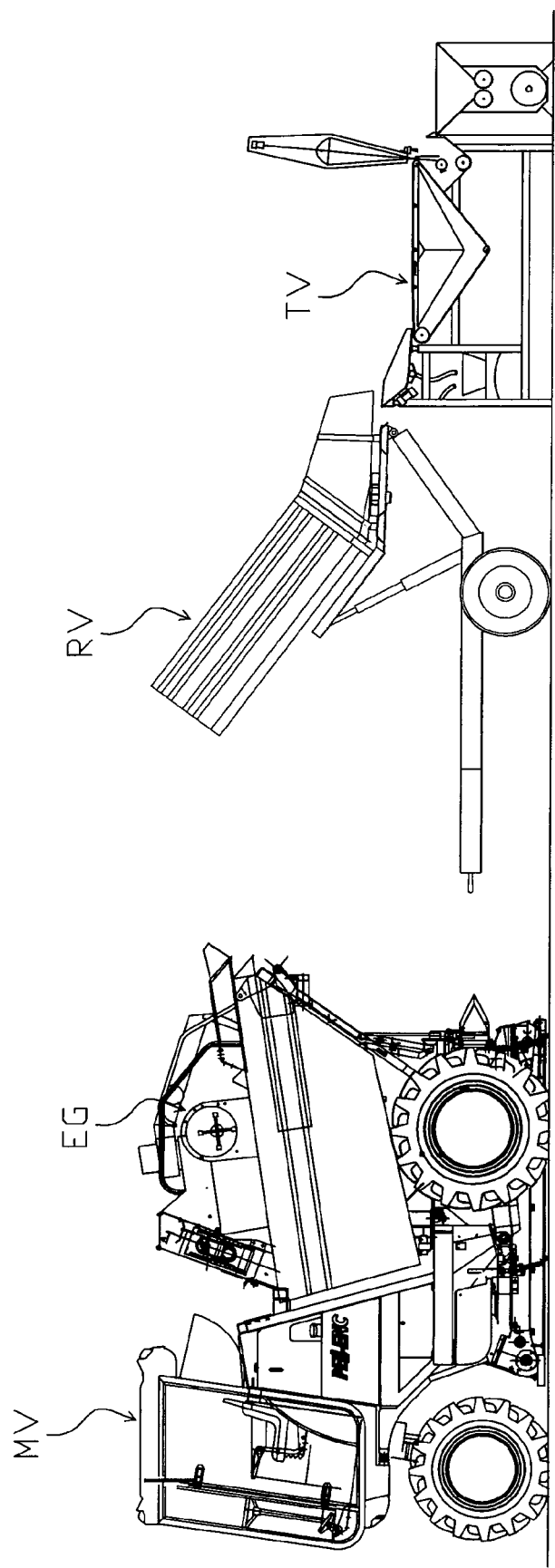

FIGS. 12, 13 and 14 show various (non-exhaustive) layout possibilities of the sorting machine which may take several forms (mobile or stationary).

FIG. 12 shows a first example of configuration of the sorting chain according to which a harvesting machine MV dumps the crop into a self-emptying trailer or into a tipping trailer RB (as shown). This trailer dumps the crop into a receiving tub CR. The latter regularly feeds a de-stalking device EG, directly or through the intermediary of a lift belt conveyor CE. The de-stalking device dumps the de-stalked crop on the vibrating distribution table where it can be spread out before falling onto the oblique conveyor of the sorting machine TV, shown in a stationary position. The output is set by the receiving tub CR and adjusted to the output of the sorting machine TV.

FIG. 13 shows a second example of configuration of the sorting chain according to which a harvesting machine MV dumps the crop into a trailer with a sliding bottom RF. This trailer with a sliding bottom regularly feeds a de-stemming or de-stalking device, directly or through the intermediary of a lift belt conveyor CE. The de-stalking device EG dumps the de-stemmed crop on a distribution table where it can be spread out before falling onto the oblique conveyor of the previously described sorting machine TV, shown in a stationary position. The output is set by the trailer with sliding bottom RF equipped with any self-regulating system to be adjusted to the output of the sorting machine TV.

FIG. 14 shows a third example of configuration of the sorting chain according to which a heavy machine MW equipped with a de-stemming system, dumps the crop into a tipping trailer RV with a vibrating spout. Then the trailer regularly feeds the sorting machine TV shown in its stationary version, onto the tilted plane of its vibrating table. The sorting system controls the output of the tipping trailer with the vibrating spout RV. This configuration illustrates a particular utilization of a sorting machine without oblique conveyor 3, the latter being retractable depending on the requirements and the quality of the crop.

The sorting chains shown in FIGS. 12 and 13 may be applied to processing of hand-picked crops. In this case they do not include a harvesting machine, but a high-powered de-stemming system.

I claim:

1. An apparatus for sorting raw berry crops in which the berry crops have healthy ripe whole berries and other components, the apparatus comprising:
    a supply system suitable for supplying the berry crops, said supply system having a downstream end;
    a vision system comprising:
        an artificial vision system for acquiring images of the berry crops exiting said supply system; and
        a processor for analyzing the acquired images so as to recognize and to differentiate the healthy ripe whole berries and the other components based on a pre-established criteria; and
    a selective sorting system for separating the healthy ripe whole berries from the other components, in real time said processor controlling said selective sorting system, said supply system spreading the berry crops into a single layer so as to align and isolate the healthy ripe whole berries and the other components in a rectilinear movement at a regulated speed so as to move the healthy ripe whole berries and the other components individually through said vision system, said vision system configured and arranged to individualize the healthy ripe whole berries and the other components in space so as to perform selective separation of the healthy ripe whole berries from the other components in real time by said selective sorting system during a free fall of the raw berry crops after release from said downstream end of said supply system.

2. The apparatus of claim 1, said artificial vision system having an image acquisition device for recording images of the healthy ripe whole berries and the other components during the movement thereof, the vision system further comprising:
    a lighting system for illuminating the healthy ripe whole berries and the other components during the recording of images, said lighting system having a light projector placed in a same plane as an optical axis of said artificial vision system.

3. The apparatus of claim 1, said vision system further comprising:
    a contrasting background arranged behind the healthy ripe whole berries and the other components, said contrasting background extending perpendicular to an optical axis of said artificial vision system.

4. The apparatus of claim 3, said contrasting background being of a color different than a color of the healthy ripe whole berries and the other components.

5. The apparatus of claim 4, said contrasting background having the color of the following relationship:

R/V≥3 and R/B≥3, where R is a level of intensity of a red color received by said image acquisition system, where V is a level of intensity of a green color received by said image acquisition system, and where B is a level of intensity of a blue color received by said image acquisition system.

6. The apparatus of claim 1, said artificial vision system having optical lines extending perpendicular to average trajectories of the healthy ripe whole berries and the other components exiting said supply system.

7. The apparatus of claim 1, said supply system comprising:

a generally horizontal conveyor having an upper bearing surface fitting for moving the healthy ripe whole berries and the other components through separate and parallel lanes toward a downstream end thereof.

8. The apparatus of claim 1, said artificial vision system having optical lines positioned adjacent a downstream end of said supply system.

9. The apparatus of claim 8, said optical lines being in a plane spaced by a distance from said downstream end of said supply system at least equal to a caliper of a largest component of the healthy ripe whole berries and the other components.

10. The apparatus of claim 9, said selective separating system having an action plane that is positioned at a distance from the plane of the optical lines at least equal to:

$b = X_{obj} + Tr \times Vc$, where $X_{obj}$ is equal to said caliper, Tr is equal to a response of the artificial vision system, and Vc is a speed of said supply system.

11. The selective apparatus of claim 3, said contrasting background comprising a rotating cylinder.

12. The apparatus of claim 1, said supply system having a regulated speed corresponding to an acquisition speed of said artificial vision system.

13. The apparatus of claim 12, said artificial vision system producing an image having square pixels.

14. The apparatus of claim 12, said supply system having a conveyor having a speed of between 1.5 and 4 meters per second.

15. The selective sorting system of claim 1, said supply system having a conveyor with a length of between 0.5 and 2.5 meters.

16. The apparatus of claim 15, said conveyor having an exit roll at an end thereof.

17. The apparatus of claim 1, said supply system having a conveyor formed of cords wound around at least two grooved rolls, said conveyor having an upper active surface having a plurality of parallel strands.

18. The apparatus of claim 17, each of said cords being tensioned at 4 daN±10% with an elongation of 1%.

19. The apparatus of claim 17, each of said cords having a sleeve of a polyurethane material surrounding a core of braided polyester material.

20. The apparatus of claim 17, each of said cords having a plurality of pins or ripples forming an exterior relief.

21. The apparatus of claim 17, said plurality of parallel strands having a space between adjacent pairs of said plurality of parallel strands, said space having a width dimension that is less than the average diameter dimension of the healthy ripe whole berries.

22. The apparatus of claim 17, said conveyor being supported on three grooved rolls, one of said three grooved rolls positioned under said active surface.

23. The apparatus of claim 22, said one of said three grooved rolls comprising at least one intermediate grooved roll positioned in a plane above the other grooved rolls so as to tension said cords at said upper active surface.

24. The apparatus of claim 17, said conveyor having a plurality of independent cord rings.

25. The apparatus of claim 23, each of said plurality of cord rings being buckled by a joint.

26. The apparatus of claim 24, said joint being removable.

27. The apparatus of claim 25, said joint being a cardan joint.

28. The apparatus of claim 1, said supply system having an oblique conveyor positioned upstream of a supply conveyor, said oblique conveyor having an active surface movable from a bottom to a top thereof in a direction opposite to a drop-off movement of the healthy ripe whole berries and the other components dumped on said oblique conveyor, said active surface of said oblique conveyor being smooth or having strips.

29. The apparatus of claim 27, said active surface of said oblique conveyor having an adjustable tilt ranging between 45° to 55° in relation to horizontal and a speed of between 0.05 and 0.3 meters per second.

30. The apparatus of claim 27, said oblique conveyor having a cleaning device cooperative with said active surface thereof.

31. The apparatus of claim 27, said supply system having a vibrating slide shovel positioned between said oblique conveyor and said supply conveyor.

32. The apparatus of claim 30, said vibrating slide shovel having an active surface in a first tilted plane positioned below and parallel to said oblique conveyor and in a second tilted plane slanted to horizontal in a range of between 0° and 10°.

33. The apparatus of claim 1, said supply system having at least one separating device for receiving juice from the other components.

34. The apparatus of claim 1, said selective separating system comprising at least one bank of pneumatic nozzles each positioned in a vertical plane.

35. The apparatus of claim 33, said at least one bank of pneumatic nozzles comprising at least two banks of pneumatic nozzles stacked one above the other.

36. The apparatus of claim 33, said pneumatic nozzles being aligned with optical lines of said artificial vision device.

37. The apparatus of claim 1, said vision system comprising a box-shaped housing, said housing having a closing shutter which closes automatically when said vision system is shut off, said housing having a fan or a source of compressed air suitable for creating an over-pressure in said housing so as to create an air stream exiting at said closing shutter.

38. A sorting machine having the apparatus of claim 1 which is an installation operating in a fixed location.

39. A sorting machine having the apparatus of claim 1 which is a mobile installation.

40. The sorting machine of claim 38, further comprising:
a means for dumping the healthy ripe whole berries onto an upstream part of said supply system so as to match an output rate of the selective sorting system.

* * * * *